(12) United States Patent
Malekpour

(10) Patent No.: US 10,025,344 B2
(45) Date of Patent: Jul. 17, 2018

(54) SELF-STABILIZING DISTRIBUTED SYMMETRIC-FAULT TOLERANT SYNCHRONIZATION PROTOCOL

(71) Applicant: The United States of America as represented by the Administrator of the National Aeronautics and Space Administration, Washington, DC (US)

(72) Inventor: Mahyar R. Malekpour, Hampton, VA (US)

(73) Assignee: THE UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 115 days.

(21) Appl. No.: 15/097,883

(22) Filed: Apr. 13, 2016

(65) Prior Publication Data
US 2016/0315757 A1 Oct. 27, 2016

Related U.S. Application Data

(60) Provisional application No. 62/150,322, filed on Apr. 21, 2015.

(51) Int. Cl.
*G06F 1/12* (2006.01)
*G06F 11/07* (2006.01)
(Continued)

(52) U.S. Cl.
CPC .................. *G06F 1/12* (2013.01); *G06F 1/04* (2013.01); *G06F 11/0709* (2013.01);
(Continued)

(58) Field of Classification Search
CPC .... G06F 11/0709; G06F 11/079; G06F 11/14; G06F 11/1675; G06F 1/04; G06F 1/12;
(Continued)

(56) References Cited

U.S. PATENT DOCUMENTS

| 4,866,606 A | 9/1989 | Kopetz |
| 4,979,191 A | 12/1990 | Bond et al. |

(Continued)

OTHER PUBLICATIONS

Koptez, H. "Real-Time Systems Design Principles for Distributed Embedded Applications," 1997, p. 47, Kluwer Academic Publishers.

(Continued)

*Primary Examiner* — Joshua Kading
(74) *Attorney, Agent, or Firm* — Andrea Z. Warmbier; Robin W. Edwards; Mark P. Dvorscak

(57) ABSTRACT

A network system includes at least one node configured to exchange messages through a set of communication links. Each node includes a synchronizer, a set of monitors in communication with the synchronizer, a physical oscillator and a state timer clock and a local timer clock, each clock being driven by the physical oscillator and having a variable clock value that locally tracks passage of clock time for the node. The network system is configured to execute a synchronization process when a specified condition occurs. Upon receiving a Sync message, each of the nodes is configured to store an incoming Sync message, increment a local timer clock value, or ignore the Sync message based on a local timer clock value associated with an incoming Sync message.

20 Claims, 7 Drawing Sheets

(51) Int. Cl.
| | |
|---|---|
| *H04L 7/00* | (2006.01) |
| *G06F 11/16* | (2006.01) |
| *H04J 3/06* | (2006.01) |
| *H04W 56/00* | (2009.01) |
| *G06F 1/04* | (2006.01) |
| *G06F 11/14* | (2006.01) |

(52) U.S. Cl.
CPC .......... *G06F 11/0754* (2013.01); *G06F 11/14* (2013.01); *G06F 11/1675* (2013.01); *H04J 3/0638* (2013.01); *H04J 3/0647* (2013.01); *H04J 3/0652* (2013.01); *H04J 3/0658* (2013.01); *H04J 3/0676* (2013.01); *H04L 7/0054* (2013.01); *H04W 56/001* (2013.01); *H04W 56/003* (2013.01); *H04W 56/0055* (2013.01)

(58) Field of Classification Search
CPC ............. H04W 56/001; H04W 56/003; H04W 56/0055; H04J 3/0638; H04J 3/0647; H04J 3/0652; H04J 3/0658; H04J 3/0676; H04L 7/0016; H04L 7/0054
See application file for complete search history.

(56) References Cited

U.S. PATENT DOCUMENTS

| | | | |
|---|---|---|---|
| 4,984,241 | A | 1/1991 | Truong |
| 5,041,966 | A | 8/1991 | Nakai et al. |
| 5,249,206 | A | 9/1993 | Appelbaum et al. |
| 5,295,257 | A | 3/1994 | Berkovich et al. |
| 5,377,205 | A | 12/1994 | Shi |
| 5,377,206 | A | 12/1994 | Smith |
| 5,557,623 | A | 9/1996 | Discoll |
| 5,600,784 | A | 2/1997 | Bissett et al. |
| 5,775,996 | A | 7/1998 | Othmer et al. |
| 5,907,685 | A | 5/1999 | Douceur |
| 5,956,474 | A | 9/1999 | Bissett et al. |
| 5,964,846 | A | 10/1999 | Berry et al. |
| 6,178,522 | B1 | 1/2001 | Zhou et al. |
| 6,349,391 | B1 | 2/2002 | Petivan et al. |
| 6,567,927 | B1 | 5/2003 | Brinkmann |
| 6,671,821 | B1 | 12/2003 | Castro et al. |
| 7,023,884 | B2 | 4/2006 | Chuah et al. |
| 7,124,316 | B2 | 10/2006 | Kopetz et al. |
| 7,257,133 | B2 | 8/2007 | Jeske et al. |
| 7,260,652 | B2 | 8/2007 | Fuehrer et al. |
| 7,263,630 | B2 | 8/2007 | Sailer |
| 7,328,235 | B2 | 2/2008 | Mori et al. |
| 7,509,513 | B2 | 3/2009 | Toillon et al. |
| 7,792,015 | B2 | 9/2010 | Malekpour |
| 7,912,094 | B2 | 3/2011 | Hall et al. |
| 7,991,101 | B2 | 8/2011 | Kocaman et al. |
| 7,996,714 | B2 | 8/2011 | O'Connell et al. |
| 8,255,732 | B2 | 8/2012 | Malekpour |
| 8,473,663 | B2 | 6/2013 | Somervill et al. |
| 8,861,552 | B2 | 10/2014 | Malekpour |
| 2002/0129087 | A1 | 9/2002 | Cachin et al. |
| 2002/0129296 | A1 | 9/2002 | Kwiat et al. |
| 2004/0205372 | A1 | 10/2004 | Moser et al. |
| 2005/0089131 | A1 | 4/2005 | Howell et al. |
| 2006/0109868 | A1 | 5/2006 | Schopp |
| 2008/0084833 | A1 | 4/2008 | Picard |
| 2009/0102534 | A1 | 4/2009 | Schmid et al. |
| 2009/0122812 | A1 | 5/2009 | Steiner et al. |
| 2010/0019811 | A1 | 1/2010 | Malekpour |
| 2012/0207183 | A1 | 8/2012 | Bobrek et al. |
| 2012/0207258 | A1* | 8/2012 | Malekpour ............... G06F 1/12 375/357 |
| 2012/0243438 | A1 | 9/2012 | Steiner et al. |

OTHER PUBLICATIONS

Arenas, Alex et al., "Synchronization in complex networks" Physics Reports, Dec. 2008, pp. 93-153, vol. 469, Issue 3.

Daliot, Ariel et al., "Linear Time Byzantine Self-Stabilizing Clock Synchronization," Proceedings of 7th International Conference on Principles of Distributed Systems, Dec. 2003, pp. 1-12, La Martinique, France.

Davies, Daniel et al., "Synchronization and Matching in Redundant Systems," IEEE Transactions on Computers, Jun. 1978, pp. 531-539, vol. C-72, No. 6.

Dijkstra, Edsger W., "Self-stabilizing Systems in Spite of Distributed Control," Communications of the ACM, Nov. 1974, pp. 643-644, vol. 17, No. 11.

Dolev, Shlomi, et al., "Self-stabilizing Clock Synchronization in the Presence of Byzantine Faults," Journal of the ACM, Sep. 2004, pp. 780-790, vol. 51, No. 5.

Daliot, Ariel, et al., "Linear Time Byzantine Self-stabilizing Clock Synchronization," http://www.cs.huji.ac.ll/-dolev/pubs/byz-ss-clock-synch-TR pdf, Aug. 7, 2004, pp. 1-18.

Lamport, Leslie et al., "Synchronizing Clocks in the Presence of Faults," Journal of the ACM, Jan. 1985, pp. 52-78, vol. 32, No. 1.

Malekpour, Mahyar T., "Comments on the "Byzantine Self-Stabilizing Pulse Synchronization" Protocol Counterexamples," NASA TM-2006-213951, Feb. 2006.

Malekpour, Mahyar R., "A Byzantine-Fault Tolerant Self-Stabilizing Protocol for Distributed Clock Synchronization Systems," Eigth International Symposium on Stabilization, Safety, and Security of Distributed Systems, Nov. 2006, pp. 1-17.

Malekpour, Mahyar R., "Verification of a Byzantine-Fault-Tolerant Selft-Stabilizing Protocol for Clock Synchronization," IEEE Aerospace Conference, Mar. 1-8, 2008, pp. 1-13, Big Sky, Montana.

Malekpour, Mahyar R., "A Self-Stabilizing Byzantine-Fault-Tolerant Clock Synchronization Protocol," NASA/TM-2009-215758, Jun. 2009.

Mirollo, Renato e., et al., "Synchronization of Pulse-Coupled Biological oscillators," SIAM Journal on Applied Mathematics, Dec. 1990, pp. 1645-1662, vol. 50, No. 6.

Peskin, Charles S., "Mathematical Aspects of Heart Physiology," 1975, pp. 241-278, Courant Institute of Mathematics Sciences, New York, New York.

Srikanth, T. K., et al., "Optimal Clock Synchronization," Journal of the ACM, Jul. 1987, pp. 626-645, vol. 34, No. 3.

Welch, Jennifer L., et al., "A New Fault-Tolerant Algorithm for Clock Synchronization," Information and Computation, Apr. 1986, pp. 1-36, vol. 77, No. 1, Academic Press, Inc.

Daliot, Ariel, et al., "Self-Stabilizing Pulse Snchronization Inspired by Biological Pacemaker Networks," http://arxiv.org/pdf/0803.0241v2.pdf, Mar. 4, 2008, pp. 1-45.

Daliot, Ariel, et al., "Linear-time Self-stabilizing Byzantine Clock Sychronization," http://arxiv.org/pdf/cs/0608096v1.pdf, Aug. 25, 2006, pp. 1-31.

Malekpour, Mahyar R., "A Self-Stabilizing Byzantine-Fault-Tolerant Clock Synchronization Protocol," NASA/TM-2014-218285, Jul. 2014, pp. 1-27.

Malekpour, Mahyar R., "Model Checking a Byzantine-Fault-Tolerant Self-Stabilizing Protocol for Distributed Clock Synchronization Systems," NASA/TM-2007-215083, Jan. 1, 2007, pp. 1-36.

Malekpour, Mahyar R., "A Self-Stabilizing Byzantine-Fault-Tolerant Clock Synchronization Protocol", NASA TM-2008, Jan. 2008, pp. 1-42.

Malekpour, Mahyar R., "A Self-Stabilizing Byzantine-Fault-Tolerant Clock Synchronization Protocol", NASA LaRC Abstract, Nov. 26, 2007, pp. 1-14.

Malekpour, Mahyar R., "A Self-Stabilizing Byzantine-Fault-Tolerant Clock Synchronization Protcol", NASA LaRC Abstract, May 23, 2008, pp. 1-14.

* cited by examiner

ValidateMessage():
if (incoming message = Sync) and (MessageTimer ≥ D)  // store it.
    MessageValid = true.
    MessageTimer = 0.
elseif (MessageTimer ≥ MessageLifeSpan)  // it expired
    MessageValid = false.
elseif (MessageTimer < MessageLifeSpan)
    MessageTimer = MessageTimer + 1.

Accept():
if (number of stored Sync messages ≥ $T_A$)
    return true.
else
    return false.

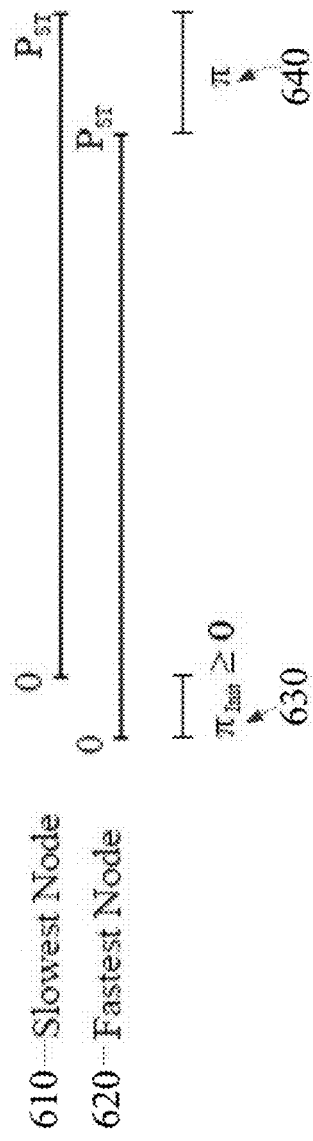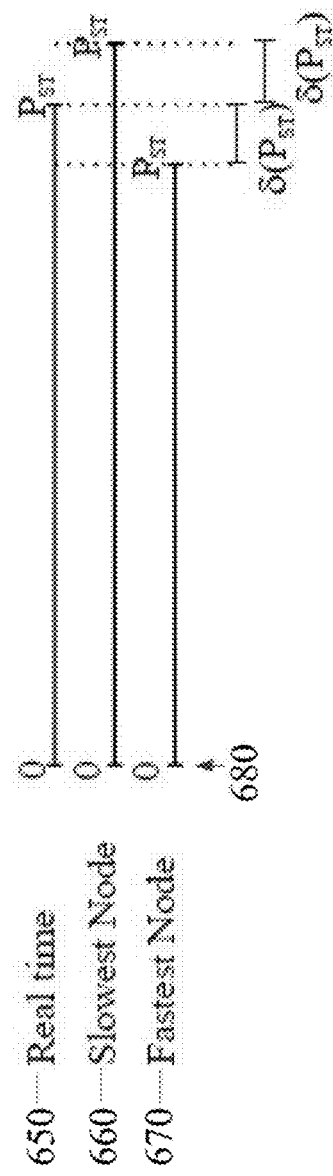
FIG. 6A
FIG. 6B

| Time | N1,SeqTimer | N2,SeqTimer | N3,SeqTimer | N1,LocalTimer | N2,LocalTimer | N3,LocalTimer | Δsync() |
|---|---|---|---|---|---|---|---|
| ... | 6 | 6 | 5 | 0 | 0 | 999 | 12 |
| | 7 | 7 | 6 | 1 | 1 | 0 | 1 |
| t+0 | 1000ᵗʰ_Sync | ... | ... | 994 | 992 | 982 | 12 |
| t+1 | 1000ᵗʰ | 998 | 988 | 995 | 993 | 983 | 12 |
| t+2 | 1000ᵗʰ | 999 | 989 | 996 | 994 | 984 | 12 |
| t+3 | 1000ᵗʰ | 1000ᵗʰ_Sync | 990 | 997 | 995 | 985 | 12 |
| t+4 | 1000ᵗʰ_Sync | 1000ᵗʰ | 991 | 998 | 996 | 986 | 12 |
| t+5 | 1000ᵗʰ | 1000ᵗʰ | 992ᵗʰ | 999 | 997 | 987 | 12 |
| t+6 | 1000ᵗʰ | 1000ᵗʰ_Sync | 993ᵗʰ | 1000 | 998 | 988 | 12 |
| t+7 | 1000ᵗʰ | 1000ᵗʰ | 994ᵗʰ | 1001 | 999 | 989 | 12 |
| t+8 | 0ᵗʰ_Accept | 0ᵗʰ_Accept | 995ᵗʰ | 1002 | 1000 | 990 | 12 |
| t+9 | 0ᵗʰ_Accept | 0ᵗʰ_Accept | 996ᵗʰ_Accept | 1003 | 1001 | 991 | 12 |
| t+10 | 0ᵗʰ_Accept | 0ᵗʰ_Accept | 0ᵗʰ_Accept | 1004 | 1002 | 992 | 12 |
| t+11 | 0ᵗʰ_Accept | 0ᵗʰ_Accept | 0ᵗʰ_Accept | 1005 | 1003 | 993 | 12 |
| t+12 | 1ˢᵗ | 1ˢᵗ | 0ᵗʰ_Accept | 1006 | 1004 | 994 | 12 |
| t+13 | 2ⁿᵈ | 2ⁿᵈ | 1ˢᵗ | 1007 | 1005 | 995 | 12 |
| t+14 | 3ʳᵈ | 3ʳᵈ | 2ⁿᵈ | 1008 | 1006 | 996 | 12 |
| t+15 | 4ᵗʰ | 4ᵗʰ | 3ʳᵈ | 1009 | 1007 | 997 | 12 |
| t+16 | 5ᵗʰ | 5ᵗʰ | 4ᵗʰ | 1010 | 1008 | 998 | 12 |
| t+17 | 6ᵗʰ | 6ᵗʰ | 5ᵗʰ | 0 | 0 | 999 | 12 |
| t+18 | 7ᵗʰ | 7ᵗʰ | 6ᵗʰ | 1 | 1 | 0 | 1 |
| t+19 | 8ᵗʰ | 8ᵗʰ | 7ᵗʰ | 2 | 2 | 1 | 1 |
| ... | | | | | | | |

FIG. 7

SELF-STABILIZING DISTRIBUTED SYMMETRIC-FAULT TOLERANT SYNCHRONIZATION PROTOCOL

CROSS-REFERENCE TO RELATED PATENT APPLICATION(S)

This patent application claims the benefit of and priority to U.S. Provisional Patent Application No. 62/150,322, filed on Apr. 21, 2015, the contents of which are hereby incorporated by reference in their entirety.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND OF THE INVENTION

Aspects of this disclosure generally relate to systems and methods for fault-tolerant synchronization protocols and in particular relate to self-stabilizing distributed-system clock synchronization protocols and systems.

Distributed systems, in which components located on networked computers communicate and coordinate their actions by passing messages, have increasingly become an integral part of many safety-critical computing applications. As such, there is a need for system designs that incorporate complex fault-tolerant resource management functions to provide globally coordinated operations with ultra-reliability. Robust clock synchronization has resultantly become a fundamental component of many fault-tolerant safety-critical distributed systems.

Most clocks employ oscillators as timekeeping elements. Such oscillators may consist of physical objects that oscillate repetitively at a constant frequency, i.e., physical oscillators. Since physical oscillators are inherently imperfect, local clocks of nodes of a distributed system, driven by these physical oscillators, do not keep perfect time and can drift with respect to real time and with respect to one another. Thus, the local clocks of the nodes must periodically be resynchronized. As a result, there is a need for a fault-tolerant system with a clock synchronization algorithm that tolerates imprecise local clocks and faulty behavior by some processes.

Prior solutions for synchronization systems have not resolved the need for an approach to perform the above functions with precision, accuracy, efficiency, or that has cross-applicability to many various system architectures. Therefore, there is a need for systems and methods that address one or more of the deficiencies described above.

BRIEF SUMMARY OF THE INVENTION

Aspects of the present invention relate to a protocol (e.g., an algorithm) that tolerates symmetric faults in local clocks of nodes of a distributed system, provided that there are more good nodes than faulty ones. Aspects of the present invention also include model checking of a bounded model of a protocol in order to validate the correctness of the protocol as it applies to fully connected networks and confirm determinism and linear convergence.

One aspect of the invention is a network system including at least one node configured to exchange messages through a set of communication links. Each node may include a synchronizer, a set of monitors in communication with the synchronizer, a physical oscillator, a state timer clock and a local timer clock. The quantity of monitors may be equal to one less than a quantity of nodes, and each monitor in the set of monitors may be configured to receive the messages. Each of the clocks may be driven by the physical oscillator and have a variable clock value that locally tracks passage of clock time for the node. The network system may be configured to execute a synchronization process by causing a first node to transmit a burst of consecutive Sync messages to other nodes. Upon receiving a Sync message, each of the nodes may be configured to determine whether a local timer clock value associated with an incoming Sync message meets a minimum event response delay value and store the incoming Sync message upon determining the local timer clock value associated with the incoming Sync message meets the minimum event response delay value. Each of the nodes may also be configured to determine whether the local clock timer value associated with the incoming Sync message is less than a Sync message lifespan, increment the local timer clock value upon determining the message is less than the Sync message lifespan, and ignore the Sync message otherwise, and upon determining a number of stored Sync messages is at least equal to a fault function, indicate an accept event and set a state timer clock value to zero.

One embodiment of the invention is a self-stabilizing, symmetric-fault tolerant synchronization protocol for self-stabilizing a fully connected network from an arbitrary state. The network may include any number of symmetric faulty nodes. The synchronization protocol may apply to realizable systems while allowing for differences in network elements. In some aspects, the network may include more good nodes than faulty nodes. A constraint on the behavior of a node may be that interactions with other nodes are restricted to defined links and interfaces. The synchronization protocol may operate without relying on assumptions about an initial state of the system and without the use of a central clock or centrally generated signal, pulse, or message. The nodes may be anonymous, i.e., the node may not have unique identities. In some aspects, model checking results of a bounded model of the synchronization protocol may be included to validate the correctness of the synchronization protocol applied to fully connected networks. Such model checking results may also confirm determinism and linear convergence of the synchronization protocol. The synchronization protocol may apply to any method that can guarantee message symmetry across receiving good nodes.

Another embodiment of the invention is a synchronization protocol configured to deterministically converge with a linear convergence time with respect to a self-stabilization period. The synchronization protocol may thus have the benefit of low overhead, fast detection and fast recovery times.

Yet another embodiment of the invention is a self-stabilizing protocol. The self-stabilizing protocol may be used in GPS (Global Positioning System) denied environments or in non-existent GPS environments (e.g., a Mars mission), embedded systems, power grids, distributed process controls, synchronizations, computer networks, the Internet, Internet applications, security, safety, automotive, aircraft, distributed air traffic management systems, swarm systems, wired and wireless telecommunications, graph theoretic problems, leader election, TDMA (time division multiple access), and banking and commerce. In some embodiments, the self-stabilizing protocol may be used in applications having distributed systems that can use synchronization in order to design more robust distributed systems.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIG. 3 is a listing of protocol functions in accordance with one or more aspects of the present disclosure.

FIGS. 6A and 6B are schematic illustrations of network precision for a system with two nodes having an initial nonzero precision and for a system where all nodes start in synchrony, respectively, in accordance with one or more aspects of the present disclosure.

FIG. 7 is a table depictions of an execution trace of a network system in accordance with one or more aspects of the present disclosure.

DETAILED DESCRIPTION OF THE INVENTION

Figure 1:
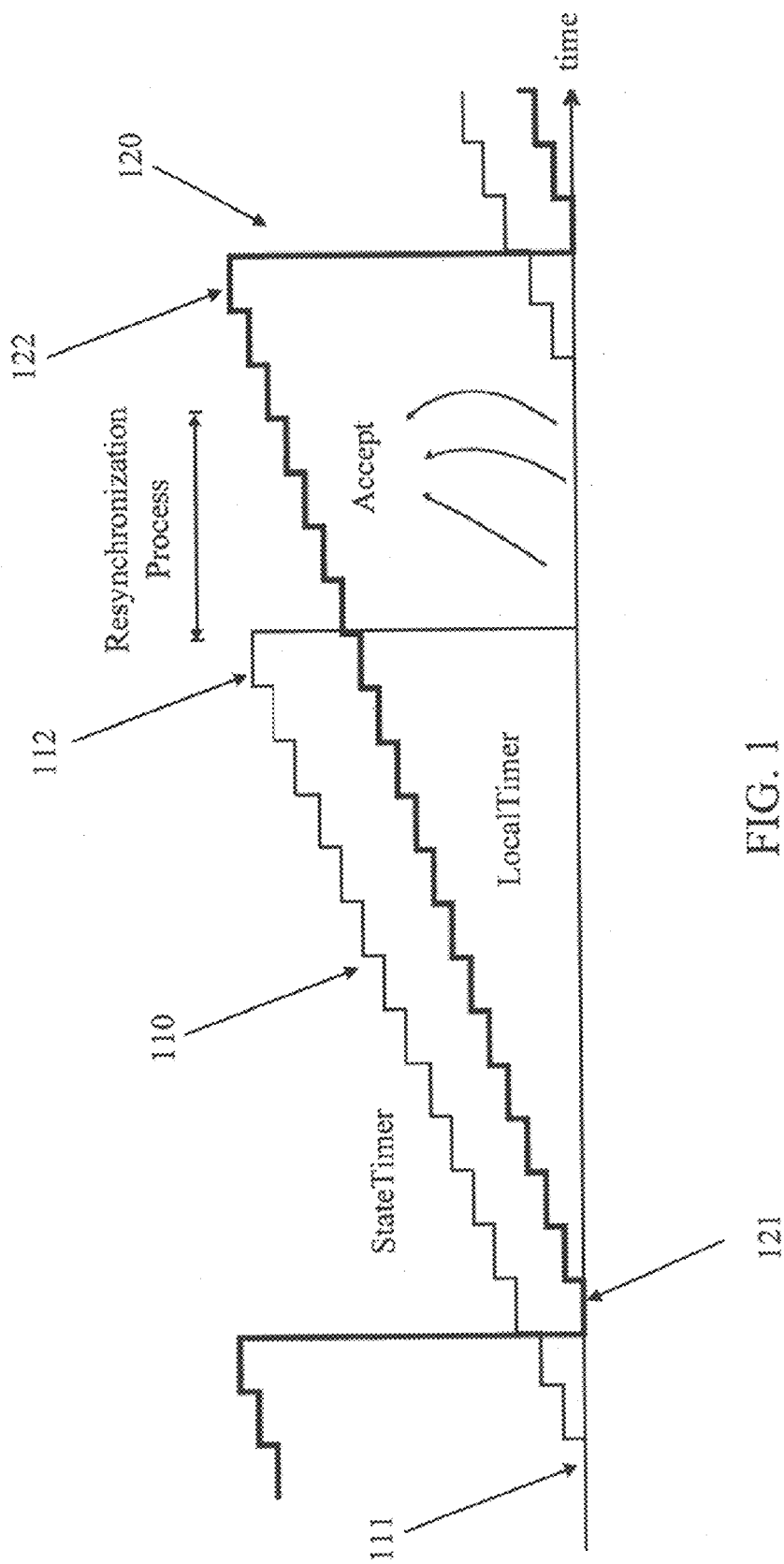
FIG. 1 is a time plot of an activity sequence of a node during steady state in an example network in accordance with one or more aspects of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In the following description of various examples of the invention, reference is made to the accompanying drawings which show, by way of illustration, various example systems and environments in which aspects of the present disclosure may be practiced. It is to be understood that other specific arrangements of parts, example systems, and environments may be utilized and structural and functional modifications may be made without departing from the scope of this disclosure.

In addition, the present disclosure is described in connection with one or more embodiments. The descriptions set forth below, however, are not intended to be limited only to the embodiments described. To the contrary, it will be appreciated that there are numerous equivalents and variations that may be selectively employed that are consistent with and encompassed by the disclosures below.

As used herein, synchronization is intended to encompass self-stabilizing clock synchronization in distributed systems. Synchronization may have significance as a fundamental service for higher-level algorithms that solve other problems. For example, in safety-critical TDMA (Time Division Multiple Access) architectures, synchronization may be the most crucial element of these systems. In the context of synchronization, the convergence and closure properties address achieving and maintaining network synchrony, respectively.

There are many known systems that deal with the closure property which either do not address convergence or provide an ad hoc solution for initialization and integration, separately. Typically, the assumed topology in such systems is a regular graph, such as a fully connected graph or a ring. Although these topologies do not necessarily correspond to practical applications or biological, social, or technical networks, they nevertheless provide a base case to solve the distributed synchronization problem. Furthermore, the existing models and solutions do not always achieve synchrony and, therefore, do not solve the general case of the distributed synchronization problem. Furthermore, even when the solutions achieve synchrony, the time to achieve synchrony is often very large.

As described herein, a fault may be a defect or flaw in a system component resulting in an incorrect state. Capability to handle faults in distributed systems may add a new dimension of complexity of the synchronization of fault-tolerant distributed systems. A fundamental property of a robust distributed system is the capability of tolerating and potentially recovering from failures that are not predictable in advance. Various known systems may overcome failures by tolerating Byzantine faults. Other known systems may address permanent faults, where the issue of transient failures is either ignored or inadequately addressed. Other systems, i.e., Byzantine clock synchronization algorithms, are based on assumptions on initial synchrony of the nodes or existence of a common pulse at the nodes. There are also clock synchronization algorithms that are based on randomization and, therefore, are non-deterministic.

Byzantine-fault-tolerant self-stabilizing protocols for distributed systems may be demonstrated via mechanical verification to self-stabilize from any state, in the presence of at most one permanent Byzantine faulty node, and to deterministically converge in linear time with respect to the synchronization period. These protocols, however, do not solve the general case of the problem in the presence of multiple Byzantine faults.

The present disclosure relates to systems and methods for solving the Byzantine general problem for self-stabilizing a fully connected network from an arbitrary state and in the presence of any number of faults with various severities including any number of arbitrary (Byzantine) faulty nodes. Aspects described herein may be applied to realizable systems, while allowing for differences in network elements where the number of arbitrary faults is not more than a third of the network size. A node may have a constraint that interactions with other nodes are restricted to defined links and interfaces. In some aspects, such a constraint may be the only constraint applied to the node.

Systems and methods described herein may operate without relying on assumptions about the initial state of the system and without using a central clock or centrally generated signal, pulse, or message. Nodes may be anonymous, i.e., the nodes do not have unique identities. Aspects described herein also include mechanical verification of the synchronization protocols. Such mechanical verification may include verification of a bounded model of the protocol using a Symbolic Model Verifier (SMV). The model checking effort may be focused on verifying correctness of the bounded model of the protocol as well as confirming determinism and linear convergence with respect to a self-stabilization period.

As described herein, synchronization of a distributed system may encompass the process of achieving and maintaining a bounded skew among independent local clocks by exchanging local time information. A distributed system is defined to be self-stabilizing if it is guaranteed to reach a legitimate state from an arbitrary initial state in a finite amount of time and to remain in a legitimate state. For clock synchronization, a legitimate state may be a state where all parts in the system are in synchrony.

Aspects of the present disclosure describe a self-stabilizing distributed-system clock synchronization algorithm (i.e., a protocol) configured to achieve and maintain synchrony of local clocks in a distributed system after system-wide disruptions occur in the distributed system in the presence of network element imperfections.

Aspects of the present disclosure describe systems and methods for the synchronization of a distributed system. Such systems may restore synchrony and coordinated operations after the distributed system has experienced system-wide disruptions in the presence of network element imperfections and, for ultra-reliable distributed systems, in the presence of various faults. In addition, such systems may be verifiable for accuracy and correctness, e.g., via automated formal methods. In such systems, addressing network element imperfections, such as oscillator drift with respect to real time and differences in the lengths of the physical communication media, may be necessary to make a solution applicable to realizable systems.

Aspects of the present disclosure describe systems and methods for synchronization protocols that solve the Byzantine general problem by self-stabilizing a fully connected network from an arbitrary initial state and in the presence of any number of arbitrary (Byzantine) faulty nodes for realizable systems. Such systems and methods may also allow for differences in the network elements, provided that the number of arbitrary faults is not more than a third of the network size. One main issue in the self-stabilization problem is a lack of a symmetric view of the system across all good (non-faulty) nodes (processors). Systems and methods described herein may resolve this issue and may self-stabilize in the presence of symmetric faults (i.e., all good nodes observe consistent error manifestations, but do recognize there is an error. Thus, such systems and methods may first convert any message to a symmetric message and, may use a verified protocol that is based on a message symmetry assumption to solve the synchronization problem.

There are a number of ways of achieving message symmetry across the system. An Interactive Consistency (IC) algorithm, for instance, may be used to transform a message, including an asymmetric message, to a symmetric message, whereby the good nodes collectively either accept or reject the message symmetrically, i.e., an agreement, within a time bound. Other methods include using variety of engineering practices, for example, using self-checking pair at the node level or central guardian at the system level.

According to certain aspects described herein, a protocol, i.e., an algorithm, tolerates symmetric faults, provided that there are more good nodes than faulty ones. Model checking results of a bounded model of the protocol are also provided to validate the correctness of the protocol as it applies to fully connected networks and to confirm determinism and linear convergence. Such systems and methods described herein may be applied to any method that can guarantee message symmetry across all receiving good nodes.

A system of pulse-coupled entities (e.g., oscillators, pacemaker cells) may pulsate periodically at regular time intervals. These entities may be physically coupled (e.g., via wire or fiber cables, chemical processes, or wirelessly through air or vacuum) so as to be influenced by each other. Such systems may be modeled as graphs with a set of nodes (vertices) that represent the pulse-coupled entities and a set of communication links (edges) that represent their interconnectivity.

The underlying topology may be a fully connected network of at least one node that exchanges messages through a set of communication links (the number of nodes are herein referred to as "K"). The nodes may be anonymous, i.e., they do not have unique identities. The system may include a set of good nodes and a set of faulty nodes. A good node may be assumed to actively participate in the synchronization process and correctly execute the protocol. A faulty node may be either benign (detectably bad), symmetric, or arbitrary (Byzantine). A faulty node may be defined from the perspective of a source node, i.e., a sender. A maximum of F faulty nodes (also referred herein as "F") may be assumed to be present in the system, where F≥0. The minimum number of good nodes in the system, "G", may be defined by G=K−F nodes. A maximum number of detectably bad nodes may be denoted by $F_D$, symmetrically bad nodes by $F_S$, arbitrarily (Byzantine) bad nodes by $F_A$, and thus, the maximum number of bad nodes may be determined by $F=F_D+F_S+F_A$. The communication links may be assumed to connect a set of source nodes to a set of destination nodes with a source node being different than a destination node. In some aspects, there may be no physical self-loop link from at least one node back to itself. A faulty link behavior may be attributed to its source node. Therefore, all communication links may be assumed to be good, i.e., reliably transfer data from their source nodes to their destination nodes. The nodes may communicate with each other by exchanging broadcast messages. Broadcast of a message by a node may be realized by transmitting the message to all nodes that are directly connected to thereto at the same time or within a threshold time frame, including real-time transmissions. The communication network may not guarantee any relative order of arrival of a broadcast message at the receiving nodes. In other words, a consistent delivery order of a set of messages may not necessarily reflect the temporal or causal order of the message transmissions. There may be neither a central system clock nor an externally-generated global pulse or message at the network level. Communication links and nodes may behave arbitrarily, provided that the system eventually adheres to the protocol assumptions.

Each of a plurality of nodes may be driven by an independent, free-running local physical oscillator (i.e., the phase is not controlled in any way) and two clocks (i.e., counters), denoted as StateTimer and LocalTimer, which locally keep track of the passage of time and are driven by the local physical oscillator. For example, the StateTimer may be used for operations local to the node as they relate to achieving and maintaining synchrony among the good nodes and the LocalTimer may be used to filter out inherent deviation in the StateTimer during a resynchronization process by providing a jitter-free clock to higher level protocols. The LocalTimer may also be used in assessing the state of the system from an external perspective.

Regarding the oscillator, an oscillator tick or a clock tick is a discrete event and a basic unit of time in the network.

An ideal oscillator may be defined as having a zero drift rate with respect to real time, thus perfectly marking the passage of time, however, real oscillators may be characterized by non-zero drift rates with respect to real time. The oscillators of the nodes may be assumed to have a known bounded drift rate, ρ, where ρ is a constant, unitless, non-negative real value and is constrained to 0≤ρ<<1. The maximum drift of the fastest clock of a good node over a time interval of t is given by (1+ρ)t. The maximum drift of the slowest clock of a good node over a time interval of t is given by (1/(1+ρ))t. Therefore, the relative drift of the fastest and slowest good nodes may be defined as (1+ρ)t−(1/(1+ρ))t.

In simulation and model checking, time may typically be modeled to reflect real time with a certain accuracy, and the drift of a node may be measured with respect to that model of time. In a distributed system, addressing clock accuracy may be orthogonal to achieving and maintaining synchrony which is a measure of the relative precision of the good nodes. Thus, in the context of a correctness proof of a distributed protocol, only the relative drift of the good nodes may be considered.

FIG. 1 schematically depicts an example activity sequence of the StateTimer 110 and LocalTimer 120 of a node during steady state in accordance with one embodiment. StateTimer 110 may take on discrete values and may have a monotonic linear function increasing from an initial value 111 to a maximum value 112. The synchronization period during steady state ("$P_{ST}$") may be defined as a largest time interval between any two consecutive resets of StateTimer 110 by a good node. As shown in FIG. 1, if uninterrupted, StateTimer 110 may periodically take on all discrete values from a zero initial value 111 to $P_{ST}$ maximum value 112, linearly increasing within each period and bounded by 0≤StateTimer≤$P_{ST}$.

LocalTimer 120 may also be driven by the local physical oscillator, and may take on discrete values and locally track passage of time. LocalTimer 120 may be a monotonic linear function increasing from an initial value 121 to a maximum value 122. The synchronization period during steady state ($P_{LT}$) may be defined as a largest time interval between any two consecutive resets of LocalTimer 120 by a good node. As shown in FIG. 1 1, if uninterrupted, LocalTimer 120 may periodically take on all discrete values from a zero initial value 121 to $P_{LT}$ maximum value, linearly increasing within each period and bounded by 0≤LocalTimer≤$P_{LT}$.

These logical clocks 110, 120 may need to be periodically synchronized due to the inherent drift in their local physical oscillators. In order to achieve synchronization, the nodes may communicate by exchanging Sync messages. The periodic synchronization during steady state, i.e., the resynchronization process, may start when a first good node begins to transmit a burst of consecutive Sync messages and may end after a last occurrence of a consequent accept event at a good node. An accept event occurs when a good node receives a sufficient number of Sync messages from as many good nodes. The sufficiency of Sync messages may be a function of the type and number of faults being tolerated.

LocalTimer 120 may be intended to be used by higher level protocols, and may be managed to provide the desired monotonically increasing value between adjustments and despite inherent deviation in StateTimer 110. LocalTimer 120 may be incremented once every local clock tick and may be reset either when upon reaching maximum allowed value 122, $P_{LT}$, or when StateTimer 110 of the node has reached a reset threshold. An example reset threshold may be variously referred herein as "ResetLocalTimerAt", where ResetLocalTimerAt is constrained by the following inequality:

$$[\pi_{init}] \leq \text{ResetLocalTimerAt} \leq P_{ST} - [\pi],$$

Where [ ] is the ceiling function, $\pi_{init}$ is the initial network precision after a resynchronization process, and π is the upper bound on the guaranteed precision.

The guaranteed synchronization precision, π, is the guaranteed upper bound on the maximum separation between LocalTimers of any two good nodes. The initial precision, $\pi_{init}$, is the maximum difference between StateTimers of any two good nodes upon completion of the resynchronization process. ResetLocalTimerAt can be given any value in the range specified in the above inequality. However, the value must be the same at all good nodes. In this inequality, the lower bound indicates when all good nodes have reset their StateTimers and the upper bound indicates when the first good node might time out and begin the next round of resynchronization process. The earliest such value may be selected at ResetLocalTimerAt=$[\pi_{init}]$, to reset the LocalTimer of all good nodes. Any value greater than $[\pi_{init}]$ may prolong the convergence time. The convergence time ("C") may be defined as the bound on the maximum time the network takes to achieve the guaranteed precision π.

Figure 2:
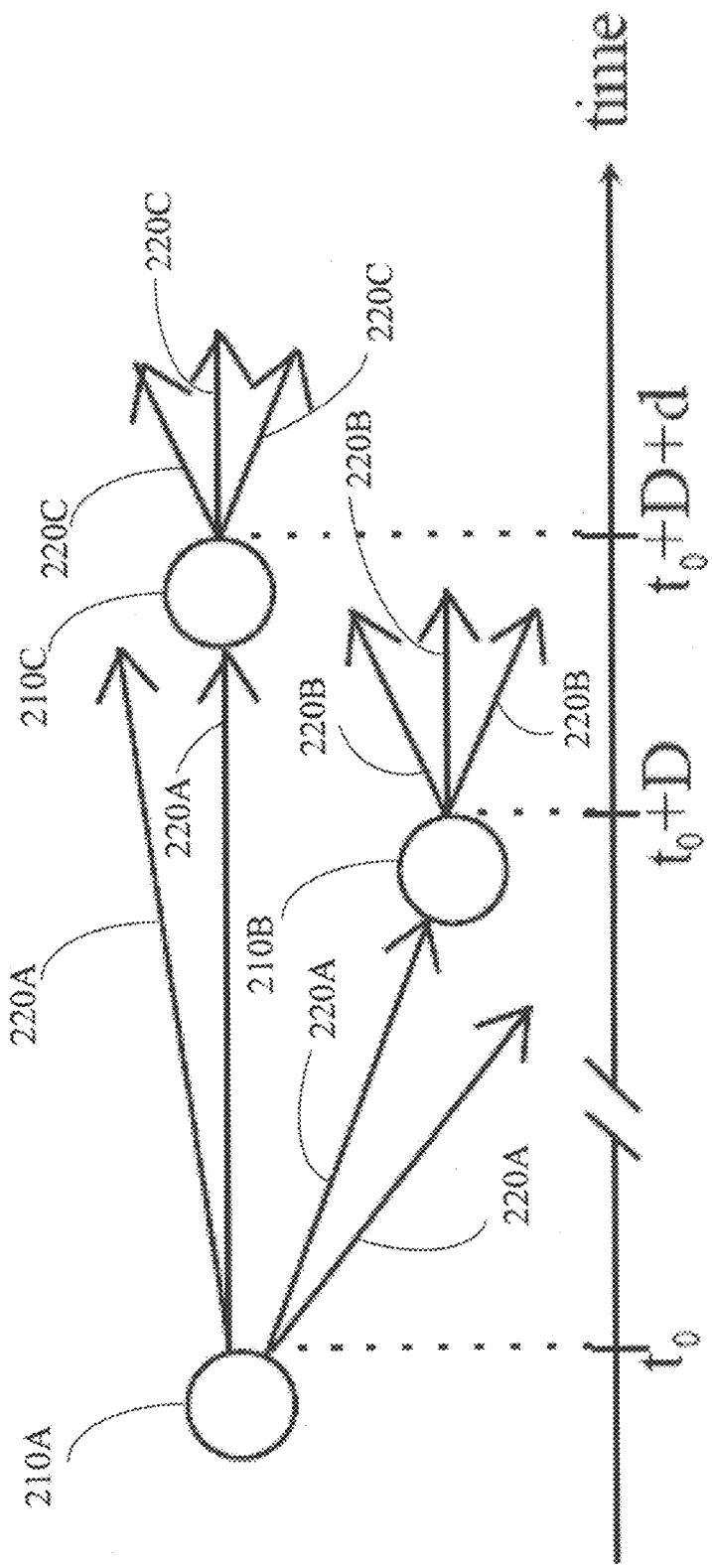
FIG. 2 is a schematic illustration of Sync message flow between connected nodes in an example network in accordance with one or more aspects of the present disclosure.

A communication delay between directly connected (adjacent) nodes may be expressed in terms of the minimum event-response delay, "D", and network imprecision, "d". FIG. 2 schematically illustrates such communication delay parameters in one example implementation. As shown in the example of FIG. 2, a message 220A transmitted by node 210A at real time "$t_0$" may be expected to arrive at its directly connected adjacent nodes 210B, 210C, and be processed. Subsequent message 220B may be generated by node 210B within the time interval $t_0$+D, and subsequent message 220C may be generated by node 210C within the time interval $t_0$+D+d. Communication between independently-clocked nodes is inherently imprecise. The network imprecision, d, is the maximum time difference among all receivers of a message from a transmitting node with respect to real time. The imprecision may be due to many factors including, but not limited to, the drift of the oscillators with respect to real time, jitter, discretization error, temperature effects and differences in the lengths of the physical communication media. In accordance with certain embodiments, these two parameters (D and d) may be assumed to be bounded such that D>0 and d≥0 and both D and d have units of real-time clock ticks. Communication delay, γ, may be defined as γ=D+d, and may have units of real-time clock ticks. Therefore, the communication delay between any two directly connected adjacent nodes may be bounded by [D, γ]. Although from an external perspective, the value of D and d, and hence γ, are real numbers, locally and at the node level, they are treated as discrete values. In other words, from the local perspective of a node, D=[D], d=[d], and γ=D+d.

In order to achieve synchronization, nodes may communicate by exchanging Sync messages. Nodes may periodically undergo a new round of the resynchronization process. For example, when a node's StateTimer times out, the node may initiate a new round of a resynchronization process by broadcasting a continual burst (e.g., once per γ) of Sync messages to all other nodes that are directly connected to it. During this process, the StateTimer may be at a maximum and may remain constant, i.e., the node neither increments nor resets its StateTimer. This process may continue until all good nodes participate in the resynchronization process and converge to guaranteed precision π. A good node may use its own message. An accept event may occur when a good node receives a sufficient number of Sync messages from good nodes. The sufficiency of Sync messages may be a function of the type and number of faults being tolerated. When an accept event occurs, the node may end its continual broadcast and conclude the resynchronization process by resetting its StateTimer. In some aspects, consecutive accept events may occur during a resynchronization process.

The duration of the resynchronization process may potentially be more than γ due to drift. During the resynchronization process, the StateTimer may hold a constant value (a maximum) and thus not be a reliable clock source for higher level protocols. To provide the desired monotonically increasing clock source for higher-level protocols, the LocalTimer may be reset when the StateTimer has reached a predefined value greater than or equal to a guaranteed initial network precision, $\pi_{init}$.

As described herein, synchrony may be a measure of the relative precision of good nodes. In order to achieve and maintain desired synchrony, the nodes may communicate by exchanging Sync messages. If only one message type is used for the operation of this protocol, the exchanged Sync messages may comprises a single bit. Assuming physical-layer error detection is dealt with separately, the reception of a Sync message may be indicative of validity in the value domain. Upon starting a new round of the resynchronization process, the node may continually send out Sync messages, once per γ, to other nodes that are connected thereto. Therefore, a Sync message may have a life-span, and the life-span of the Sync message at the receiving nodes may be limited to γ. A Sync message from a given source may be considered valid if the message arrives at or after one-D of an immediately preceding Sync message from that source. In other words, a valid message in the value domain, i.e., valid Sync messages, may be rate-constrained. Assuming physical-layer error detection is dealt with separately, the reception of a Sync message may be indicative of validity in the value and time domains. Since a good node uses its own message, and there is no physical self-loop link from the node back to itself, the message may become valid only after γ, giving the own message the longest (worst case) transmission delay time. A valid Sync message may become invalid after its life-span expires. However, while valid, the Sync message may be used multiple times and result in multiple accept events.

A node may include a synchronizer and a set of monitors. To assess the behavior of other nodes, a node may employ as many monitors as the number of nodes that are directly connected to thereto, with one monitor for each source of incoming message. A node may use, but not necessarily monitor, its own message. The message may be kept within the node such that there is no physical self-loop link back to the node. A monitor may keep track of the activities of its corresponding source node. Specifically, a monitor may read, evaluate, validate, and store the last valid message received from that node. A valid Sync message may be then conveyed to the local synchronizer. The assessment results of the monitored nodes may then be utilized by the synchronizer in the synchronization process. A monitor may dispose of valid message after expiration of the life-span.

FIG. 3 shows protocol functions including example function ValidateMessage( ) 310, that may be used by monitors to determine whether a received Sync message meets a minimum timing requirement, and thus be valid in both value and time domains, and whether a stored valid Sync message has reached its lifespan and expired. The function Accept( ) 320 may be used by the synchronizer to examine availability of sufficient valid Sync messages. The sufficiency of available, valid messages (denoted by $T_A$) may be a function of the type and number of faults to be tolerated, represented by the equations $T_A=F_D+1$ and $T_A=F_S+1$. For tolerating benign and symmetric faults, respectively, the following relations may hold: $T_A=F_D+F_S+1$ for tolerating $F_D+F_S$ simultaneous faults. When a sufficient number of messages have been received, the Accept( ) function 320 may return a Boolean value of true.

Protocols as described herein may include one or more of the following assumptions: (1) the topology is a fully connected graph; (2) the number of nodes constituting the network is K, where $K \geq 2F_S+F_D+1$, and $F_S$ is the maximum number of symmetrically bad nodes; (3) Nodes either correctly execute the protocol and are good, are symmetrically bad $F_S$ or are detectably bad $F_D$; (4) links are bidirectional and correctly transmit data from their sources to their destinations; (5) the bound on the oscillator drift rate is ρ, where $0 \leq \rho \ll 1$, (6) a message sent by a node will be received and processed by its directly-connected, adjacent nodes within γ, where γ=(D+d); and (7) physical-layer error detection is dealt with separately and the reception of a Sync message is indicative of its validity in the value and time domains.

Aspects of the present disclosure may include solutions for a self-stabilizing distributed clock synchronization problem. Time references may be assumed with respect to an initial real time $t_0$, where $t_0=0$. For all $t \geq t_0$ the system may operate within the above protocol assumptions. A maximum difference in the value of LocalTimer for all pairs of nodes at time t, $\Delta_{Net}(t)$, may be determined by the following equation that accounts for the variations in the values of the LocalTimer across all good nodes.

$r=\lceil \pi(1+\rho) \rceil$ is a time interval encompassing π,
LocalTimer$_{min}$(t)=min ($N_i$LocalTimer(t)), for all i, and
LocalTimer$_{max}$(t)=max ($N_i$LocalTimer(t), for all i.
$\Delta_{Net}$(t)=min ((LocalTimer$_{max}$(t)−LocalTimer$_{min}$(t)),
(LocalTimer$_{max}$(t−r)−LocalTimer$_{min}$(t−r))).

The synchronization precision, π, may be a guaranteed upper bound on $\Delta_{Net}$(t) for all $t \geq C$, $0 \leq \pi \ll P_{LT}$. $P_{LT}$ may have units of real time clock ticks and may be defined as an upper bound on the time interval between any two consecutive resets of the LocalTimer by a node and $P_{LT}>0$. $\Delta_{Net}$(t), for real time t, may be the maximum difference of values of the Local Timers of any two nodes (i.e., the relative clock skew) for $t \geq t_0$. C, the convergence time, may be defined as a bound on the maximum time for the network to achieve the guaranteed precision π.

To prove that a protocol is self-stabilizing, C and π values may exist such that the following self-stabilization properties hold.

1. Convergence: $\Delta_{Net}(C) \leq \pi$, $0 \leq \pi \ll P_{LT}$.
2. Closure: For all $t \geq C$, $\Delta_{Net}(t) \leq \pi$.
3. Congruence: For all nodes $N_i$, for all $t \geq C$, ($N_i$Local-Timer(t)=$\lceil r \rceil \rightarrow \Delta_{Net}(t) \leq \pi$.
4. Liveness: For all $t \geq C$, LocalTimer of every node sequentially takes on at least all discrete values in [0, $P_{ST}-\pi-\gamma$].

The above-described convergence and closure properties address achieving and maintaining network synchrony, respectively. As described herein, given sufficient time, C, the convergence property examines whether or not the system has reached a point where all nodes are within a specified precision. The closure property, on the other hand, examines whether or not the system starting within the specified precision will remain within that precision thereafter. As such, the convergence and closure properties provide an external view of the system, whereby the external viewer can examine whether or not the system has self-stabilized.

In safety-critical architectures, e.g., TDMA (Time Division Multiple Access) architectures, synchronization may be one of the most crucial elements—or even the most critical element. More precisely, TDMA-type applications may be based on the fundamental assumption of the existence of initial synchrony. Synchronization protocols in accordance with the present disclosure may provide this fundamental assumption of TDMA-type applications to higher-level protocols. However, one of the challenges in employing multiple protocols in distributed system has been the integration of these protocols operating at different levels of application. In other known systems, the integration of a lower-level protocol with higher-level protocols either has not been addressed or had simply been overlooked. The above-described congruence property addresses this integration. Unlike the convergence and closure properties that provide a system view from the perspective of an external viewer, the congruence property provides a local view from the perspective of a node by providing the necessary and sufficient conditions for the node to locally determine whether or not the system has converged. Thus, according to aspects of the present disclosure, the congruence property may be used for the integration of the underlying self-stabilization protocol with higher-level protocols in the system.

The liveness property examines whether or not a node takes on all possible discrete values within an expected range. In other words, a system may be considered to be "alive" where the good nodes execute the protocol properly and time advances within each node.

According to some aspects of the present disclosure, a self-stabilizing, symmetric-fault tolerant synchronization protocol is based on a message symmetry assumption. As described herein, in order to achieve and maintain synchrony, the nodes may communicate by exchanging Sync messages. Assuming physical-layer error detection may be dealt with separately, the reception of a Sync message may be indicative of validity in the value domain. Upon start of a new round of a resynchronization process, a node may continually send out Sync messages, once per γ, to other nodes that are connected thereto. Consequently, the life-span of a Sync message at the receiving nodes is set to be γ. Additionally for tolerating symmetric faults, sufficiency for the Accept( ) function may be determined by $T_A=F_D+F_S+1$.

Figure 4:
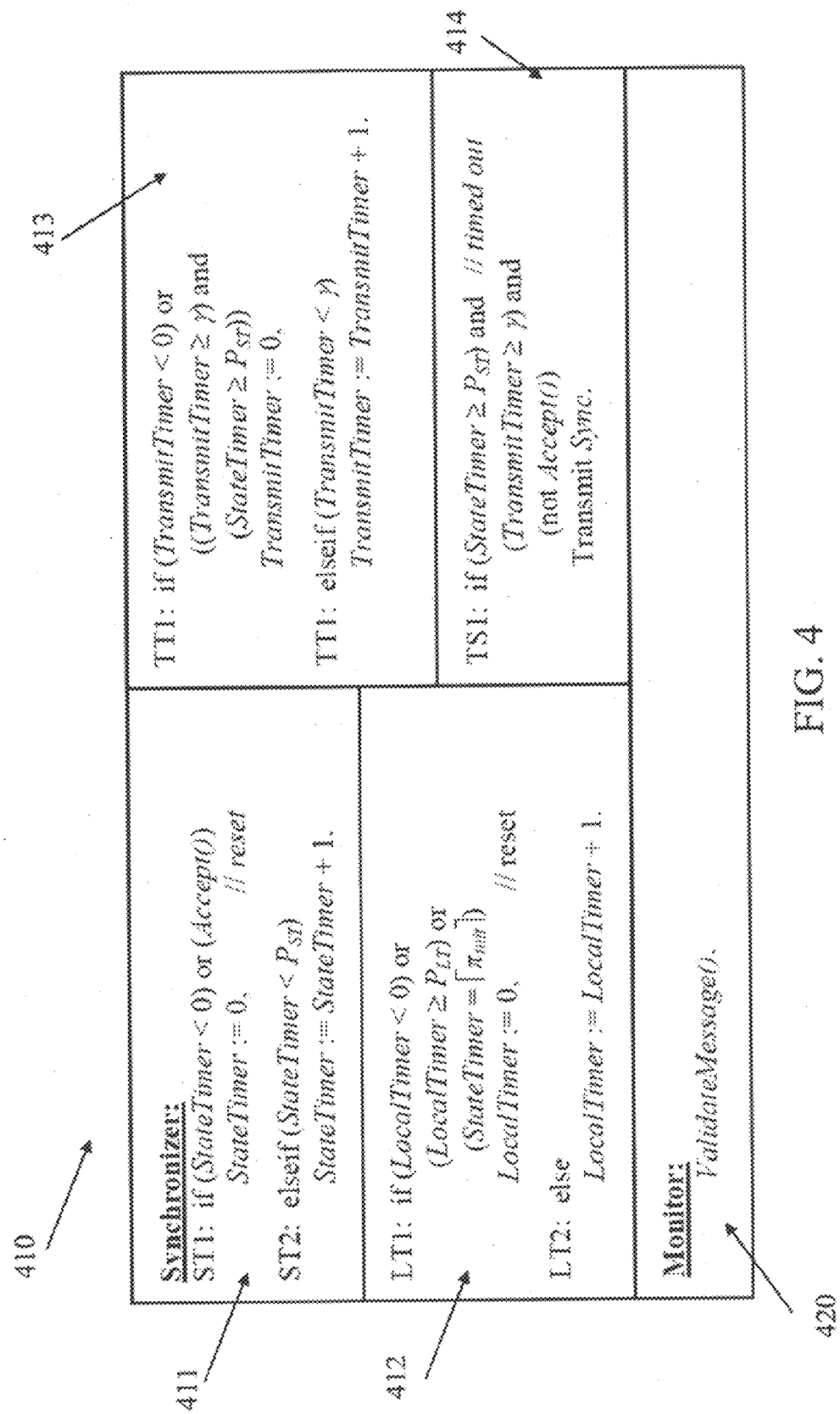
FIG. 4 is a listing of symmetric-fault protocol functions in accordance with one or more aspects of the present disclosure.

FIG. 4 depicts a symmetric-fault protocol executed by all good nodes of a distributed system. The symmetric-fault protocol may include a synchronizer 410 and a set of monitors 420 which execute once every local clock tick. Four concurrent if statements may collectively describe the synchronizer 410. These statements are labeled ST (State Timer) 411, LT (LocalTimer) 412, TS (Transmit Sync) 413, and TT (TransmitTimer) 414. The function ValidateMessage( ) 421 may describe the monitor.

The following is a list of pertinent protocol measures:

$K \geq 2F_S+1$, where $F_S$ is the maximum number of simultaneous symmetrically faulty nodes;

$\delta(P_{ST})$ denotes the maximum drift for the duration of $P_{ST}$, $\delta(P_{ST}) \geq 0$;

$0 \leq \rho \ll 1$;

$0 < D < \gamma \ll P_{ST} < P_{LT}$;

$0 \leq StateTimer \leq P_{ST}$;

$0 \leq LocalTimer \leq P_{LT}$;

$\pi_{init}=d+\gamma+\delta(d+\gamma)$;

$\pi=\pi_{init}+2\delta(P_{ST}) \geq 0$, for all $t \geq C$, and so, $0 \leq \pi \ll P_{ST}$;

$t_{rp}=\pi+2\gamma+\pi_{init}$, where $t_{rp}$ denotes duration of the resynchronization process during steady state;

$P_{LT} \geq P_{ST}+t_{rp}=P_{ST}+\pi+2\gamma+\pi_{init}$; and $C=P_{LT}+ResetLocalTimerAt+2\gamma$.

Since $0 < \gamma \ll P_{ST} < P_{LT}$, and the LocalTimer is reset after reaching $P_{LT}$ (worst-case wraparound), a trivial solution is not possible.

FIG. 7 depicts an example of a protocol in table format in accordance with the present disclosure having a fully connected graph consisting of five (5) nodes, where F=2. In particular, FIG. 7 shows an execution trace of a system and has eight (8) columns; one for time reference 710, two for each good node listing values for the StateTimer 720, 730, 740 and LocalTimer 750, 760, 780, and the last column is for network precision, π 780. Each of the rows 790 depicts activities of all good nodes at a corresponding time shown in the time reference column 710. Cell contents for the node columns may include a number corresponding to the value of the StateTimer of the node in conjunction with an activity selected from: (1) Sync if the node transmits the message, and (2) Accept if the node received TA messages. The received messages at a node are depicted in superscripts, one position for each corresponding node, where a '—' means no messages from that node and an 'x' means a Sync message was received.

FIG. 7 depicts activities of the network during a resynchronization process when the network is in steady state. Even though good nodes start the cycle in synchrony, they may gradually drift apart. The table of FIG. 7 shows a scenario where node 1 (StateTimer 720, LocalTimer 750) is the fastest and node 3 (StateTimer 740, LocalTimer 770) the slowest of the good nodes. By the end of the synchronization period node 1 and node 3 have drifted part by as much as 12 clock ticks from an external perspective. Since the faulty nodes can transmit messages at any time, their activities are not listed in the table of FIG. 7. However, their messages may be recorded at the receiving good nodes. For instance, at (t+8) a message from node 5 (a faulty node) is received by nodes 1 and 2 and d ticks later node 3 records receiving the same message. The π column 780 shows that although the instantaneous differences between the Local Timers spike up to a value of 999 at (t+17), the precision π remains within the theoretical predicted value of 16.

The parameters ρ, d, D, K, T, and $P_{ST}$ may be referred to as fundamental protocol parameters and remaining parameters may be referred to as the derived parameters. Derived protocol parameters may be computed according to the following computations.

Figure 5:
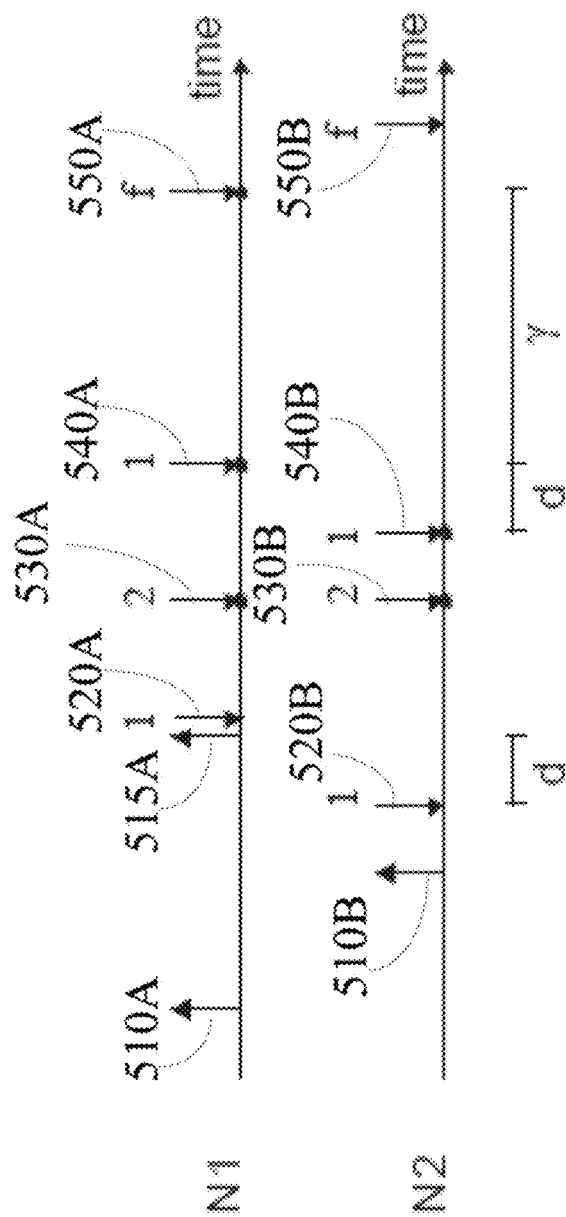
FIG. 5 is schematic illustration of network precision for two nodes of a distributed system in accordance with one or more aspects of the present disclosure.

Initial precision, $\pi_{init}$, may be defined as a maximum difference between State Timers of any two good nodes during steady state, for all t≥C, and upon completion of a resynchronization process. A time graph of network precision for two nodes, N1 and N2 is shown in FIG. 5. Transmitted Sync messages 510A, 515A, 510B are shown using an up arrow ('↑'), received Sync messages 520A, 530A, 540A, 550A, 520B, 530B, 540B, 550B are shown using a down arrow ('↓'), and accept events for received Sync messages 520A, 530A, 540A, 550A, 530B, 540B are marked by a dot ('•') on the time axis. Thus, as shown in FIG. 5, $\pi_{init}=d+\gamma+\delta(d+\gamma)$.

From the definition of the network precision, π, it follows that, for all t≥C, π is the sum of initial precision and the maximum drift among the good nodes after $P_{ST}$ from the completion of the resynchronization process. As depicted in FIG. 6A, the slowest node 610 and the fastest node 620 start with an initial precision 630 of $\pi_{init} \geq 0$. After $P_{ST}$ from the completion of the resynchronization process, the network precision 640, π, is the sum of initial precision 630 and the maximum drift between nodes 610, 620. As shown in FIG. 6B, even when the nodes start in perfect synchrony at 680, the slowest node 660 and the fastest node 670 begin in sync with real time 650. Thus, assuming a symmetric drift δ for the duration of $P_{ST}$, the precision may be computed as $\pi=2\delta(P_{ST})$. Further, even in the worst case the nodes start within $\pi_{init}$, and the precision may still be computed to be $\pi=\pi_{init}+2\delta(PST)$.

From the definition of the resynchronization process, it follows that during steady state the system may take π ticks for all good nodes to time out and to begin transmitting Sync messages. Similarly, the system may take γ ticks for transmitted messages to reach other good nodes and result in subsequent accept events at all good nodes. Since a Sync message has a life-span of one γ, subsequent accept events occur within the next γ. At the end of the resynchronization process, the good nodes are within $\pi_{init}$ ticks of each other. Thus, a duration of the resynchronization process during steady state may be computed as $t_{rp}=\pi+2\gamma+\pi_{init}$.

The value of $P_{LT}$ may be derived from the behavior of the network during steady state and be a measure of the worst case scenario between two consecutive resets of the Local-Timer of a good node. Thus, $P_{LT} \geq P_{ST}+t_{rp}=P_{ST}+\pi+2\gamma+\pi_{init}$.

The convergence time, C, may be measured from $t_0$. The value of C may be computed as the sum of one γ, due to randomness in the initial value of the Message Timer in the good nodes, plus the worst case scenario for the good nodes undergoing a resynchronization process, i.e., $P_{ST}$, and finally converging to the predicted precision π. Therefore, $C=\gamma+P_{ST}+t_{rp}ResetLocalTimerAt$, and so, $C=\gamma+P_{ST}+t_{rp}+\pi_{init}$.

A mechanical verification of the protocol may use a model checking approach for ease, feasibility, and quick examination of the problem space, while later attempting a more comprehensive proof via theorem proving. A Symbolic Model Verifier (SMV) may be used in the modeling of protocols in accordance with the present disclosure. The language description and modeling capability of SMV provide relatively easy translation from pseudo-code. Further, SMV semantics are synchronous compositions, where all assignments are executed in parallel and synchronously. Thus, a single step of the resulting model may correspond to a step in each of the components.

The protocol described in accordance with the present disclosure may be fairly subtle and cope with many kinds of timing behaviors. Model checking has been used to explore and verify distributed algorithms but may also face certain difficulties. One challenge may be a realistic representation of time as a continuous variable. However, although the network level measurements may be real values, locally and at the node level, all parameters may be discrete. The discretization may be used for practical purposes in implementing and model checking the protocol.

Computational tree logic (CTL), a temporal logic, may be used to express properties of a system. In CTL, formulas may be composed of path quantifiers and temporal operators. Claims of convergence, closure, congruence, and liveness properties as well as the claims of maximum convergence time and determinism of the protocol may be examined using the verification methods described herein. Although in the description of the protocol convergence and closure properties are stated separately, they may examined via a single CTL proposition. This proposition may also express the claims of determinism and linear convergence. Validation of the general CTL proposition may require examination of a number of underlying propositions. In particular, since $\Delta_{LocalTimer}(t)$ is defined in terms of the LocalTimer of the nodes, examination of the properties that describe proper behavior of the LocalTimer may take precedence. The variable ElapsedTime may be defined as: ElapsedTime=(GlobalClock≥ConvergenceTime).

The variable GlobalClock may be a measure of elapsed time from the beginning of the operation with respect to the real time, i.e., external view. The variable ElapsedTime may be indicative of the GlobalClock reaching its target maximum value of ConvergenceTime.

The property of SystemLiveness may address the liveness property of the system by examining whether or not time advances and whether the amount of time elapsed, ElapsedTime, has advanced beyond the predicted convergence time, ConvergenceTime.

The property ConvergenceAndClosure may encompass the criteria for the convergence and the closure properties as well as the claims of maximum convergence time and determinism. In particular, ConvergenceAndClosure may specify whether or not the system will converge to the predicted precision after the time elapsed, ElapsedTime, and whether or not the system will remain within that precision thereafter. This property are expected to hold for additional elapsed time.

The value of the AllWithinPrecision property may be determined by measuring the difference between the maximum and minimum values of the Local Timers of all nodes for the current tick, in conjunction with the result from the previous $r=\lceil \pi (1+\rho)\rceil$ ticks. The expected difference of LocalTimers may be the predicted precision bound. To eliminate trivial results and false positives, the AllWithinPrecision property may be examined, and the expected result may a value of false. This property specifies that after the elapse of convergence time, ElapsedTime, whether or not the system will not converge and, if it converges, whether or not it drifts apart beyond the expected precision bound.

The property Congruence may specify criteria for the congruence property of the protocol. Unlike the convergence and closure properties that provide system views from the perspective of an external viewer, the congruence property may provide a local view from the perspective of a node by providing necessary and sufficient conditions for the node to locally determine whether or not the system has converged. Thus, the congruence property may be essential in the integration of the underlying self-stabilization protocol with higher level protocols in the system. The congruence property may be described with respect to only one node, namely Node_1. Since all nodes are symmetric, the result of the proposition may equally apply to other nodes.

The property ProtocolLiveness may specify criteria for the liveness property of the protocol. In particular, the property may examine whether or not a node takes on all discrete values within an expected range. Again, since all nodes are symmetric, this property may be described with respect to only one node, namely Node_1.

The model checking results of the bounded model of the protocol may verify the correctness of the protocol for fully connected networks with $K \geq 2F_S+1$ nodes, starting from an arbitrary state, and for the following scenarios: $F_S$=0, 1, 2, 3, simultaneous symmetric faults, 0≤ρ<<1, D=1 and d=0; and $F_S$=2 simultaneous symmetric faults, 0≤ρ<<1, D=2, 3, and d=0, 1. In addition, the results may confirm determinism and linear convergence.

As described herein, distributed systems have become an integral part of safety-critical computing applications, necessitating system designs that incorporate complex fault-tolerant, resource-management functions to provide globally coordinated operations with ultra-reliability. As a result, there is a need for fault-tolerant system to have clock synchronization algorithms that tolerate imprecise local clocks and faulty behavior by some processes. According to the systems and methods described herein, synchronization of distributed systems in the presence of various faults, including any number of arbitrary (Byzantine) faults, is provided. One issue in solving the self-stabilization problem is a lack of a symmetric view in the system by the participating good nodes. However, according to systems and methods of the present disclosure, any messages may be first converted to symmetric messages. Then a verified protocol, based on message symmetry assumption, may be applied to solve the synchronization problem.

As described herein, there are several ways of achieving message symmetry across the system, and then presenting a new protocol based on a message symmetry assumption. Mechanical verification of the protocol for up to three simultaneous, symmetric faults is also described herein. The model-checking effort may be focused on verifying the correctness of a bounded model of the protocol as well as confirming claims of determinism and linear convergence with respect to the self-stabilization period. Accordingly, protocol systems and methods as described herein may solve the general case for fully connected graphs. Further aspects may be applicable to other topologies, such as an arbitrary graph that meets the minimum requirements of number of nodes and connectivity.

According to aspects of the present disclosure, a network system may include at least one node configured to exchange messages through a set of communication links. Each node may include a synchronizer, a set of monitors in communication with the synchronizer, a physical oscillator, a state timer clock and a local timer clock. The quantity of monitors may be equal to one less than a quantity of nodes, and each monitor in the set of monitors may be configured to receive the messages. Each of the clocks may be driven by the physical oscillator and have a variable clock value that locally tracks passage of clock time for the node. The network system may be configured to execute a synchronization process by causing a first node to transmit a burst of consecutive Sync messages to other nodes. Upon receiving a Sync message, each of the nodes may be configured to determine whether a local timer clock value associated with an incoming Sync message meets a minimum event response delay value and store the incoming Sync message upon determining the local timer clock value associated with the incoming Sync message meets the minimum event response delay value. Each of the nodes may also be configured to determine whether the local clock timer value associated with the incoming Sync message is less than a Sync message lifespan, increment the local timer clock value upon determining the message is less than the Sync message lifespan, and ignore the Sync message otherwise, and upon determining a number of stored Sync messages is at least equal to a fault function, indicate an accept event and set a state timer clock value to zero.

During the synchronization process, each node may be further configured to set the state timer clock value is to zero if the state timer clock value is less than zero, and increment the state timer clock value by one if a state timer clock value is less than a state timer synchronization period. In some examples, during the synchronization process, each node is further configured to set a transmit timer value to zero if the transmit timer value is less than zero, set the transmit timer value to zero if the transmit timer value is at least equal to a rate at which the burst of consecutive Sync messages are sent and if the state timer clock value is at least equal to the state timer synchronization period, increment the transmit timer value by one if the transmit timer value is less than the rate at which the burst of consecutive Sync messages are sent, and execute a new synchronization process if a state timer clock value at least equal to the state timer synchronization period and if the transmit timer value is at least equal to the rate at which the burst of consecutive Sync messages are sent and if the accept event is not indicated. During the synchronization process, each node may further be configured to set the local timer clock value to zero if at least one of: the local timer clock value is less than zero, the local timer clock value is greater than local timer synchronization period; and the state timer clock value equals a ceiling function of an initial network precision, and increment the local timer clock value by one otherwise.

In some aspects, the network may be an arbitrary, fully-connected self-stabilizing, via execution of the synchronization process, from any initial state, and the synchronizer of the first node may transmit the Sync message to as many other nodes in the network as are directly connected to the first node. Each node may be categorized from one of: a good node, a symmetrically bad node, a detectably bad node and an arbitrary bad node. In some examples, a number of arbitrary bad nodes may be no more than a third of a total number of nodes. The fault function may be based on considered faulty node types, and the faulty node types may include symmetrically bad nodes, detectably bad nodes and arbitrary bad nodes. Exchange of messages of each node with other nodes may be restricted to defined communication links. In some examples, at least one of the nodes may be anonymous. In some examples, each of the burst of consecutive Sync messages may include a 1-bit message. In some examples, the communication links may be bidirectional.

According to some aspects of the present disclosure, self-stabilizing network includes a plurality of nodes ("K") in communication with each other. Each of the nodes may include a synchronizer, a set of monitors, a physical oscillator, a state timer clock and a local timer clock. The set of monitors may include no more than K−1 monitors in communication with the synchronizer. Each monitor in the set of monitors may be configured to receive transmitted Sync messages and to locally keep track of time for a Sync message in complying with a Sync message lifespan. Each of the clocks may be driven by the physical oscillator. Each of the monitors may be in communication with the synchronizer. Each clock may locally keep track of passage of time in a node of the synchronizer as a variable integer clock value. The synchronizer may be further configured to execute a synchronization process upon the state timer clock reaching a maximum value of $P_{ST}$. For each Sync message received, the synchronizer may further be configured to increment a stored Sync message count when a local timer clock value is at least equal to a minimum event response delay value. The local timer clock value may be incremented when the local timer clock value is less than a Sync message lifespan value, ignore the Sync message when the local timer clock value is at least equal to the Sync message lifespan. An accept event may be indicated when the stored Sync message count is at least equal to a fault function value.

In some aspects the synchronizer may execute the synchronization process without using a central clock or a centrally-generated signal, centrally-generated pulse, or centrally-generated message of any kind for self-stabilization and without relying on an initial state of the network. The fault function value may be computed based on a type and number of tolerated faults in the plurality of nodes and may equal one plus the number of tolerated faults. A state timer clock value may be set to zero upon indicating the accept event. Each monitor may dispose of all previously stored Sync messages and the stored Sync message count may be set to zero upon indicating the accept event. The variable K may be at least equal a sum of two times a number of symmetrically faulty nodes plus a number of detectably faulty nodes plus one.

In some aspects, the synchronizer may further configured to determine a network precision based on a sum of an initial precision of the network and a maximum drift among good nodes after a state timer synchronization period. The synchronizer may be further configured to mechanically verify the synchronization process based on convergence, congruence and liveness properties.

Systems and methods for self-stabilizing protocols in accordance with the present disclosure may have many practical applications as well as many theoretical implications, including but not limited to: GPS (Global Positioning System) denied environments or environments where GPS is non-existent (e.g., Mars mission), embedded systems, power grid, distributed process control, synchronization, computer networks, the Internet, Internet applications, security, safety, automotive, aircraft, distributed air traffic management systems, swarm systems, wired and wireless telecommunications, graph theoretic problems, leader election, TDMA (time division multiple access), and banking and commerce are a few examples. The above applications encompass some of the many areas of distributed systems that can use synchronization in order to design more robust distributed systems.

While preferred embodiments and example configurations of the invention have been herein illustrated, shown and described, it is to be appreciated that various changes, rearrangements and modifications may be made therein, without departing from the scope of the invention as defined by the claims. It is intended that specific embodiments and configurations disclosed are illustrative of the preferred and best modes for practicing the invention, and should not be interpreted as limitations on the scope of the invention as defined by the appended claims and it is to be appreciated that various changes, rearrangements and modifications may be made therein, without departing from the scope of the invention.

While the invention has been described with respect to specific examples including presently preferred modes of carrying out the invention, those skilled in the art will appreciate that there are numerous variations, combinations, and permutations of the above described systems and methods. Those skilled in the art will understand that various specific features may be omitted and/or modified in without departing from the invention. Thus, the reader should understand that the spirit and scope of the invention should be construed broadly as set forth in the appended claims.

What is claimed is:

1. A network system comprising at least one node configured to exchange messages through a set of communication links, wherein each node includes:
    a synchronizer;
    a set of monitors in communication with the synchronizer, a quantity of monitors being equal to one less than a quantity of one or more nodes, wherein each monitor in the set of monitors is configured to receive the messages;
    a physical oscillator; and
    a state timer clock and a local timer clock, each clock being driven by the physical oscillator and having a variable clock value that locally tracks passage of clock time for the respective node;
    wherein the network system is configured to execute a synchronization process by causing a first node to transmit a burst of consecutive Sync messages to other nodes, and
    wherein, upon receiving a Sync message, each of the nodes is configured to:
        determine whether a local timer clock value associated with an incoming Sync message meets a minimum event response delay value;
        store the incoming Sync message upon determining the local timer clock value associated with the incoming Sync message meets the minimum event response delay value;
        determine whether the local clock timer value associated with the incoming Sync message is less than a Sync message lifespan;
        increment the local timer clock value upon determining, the message is less than the Sync message lifespan, and ignore the Sync message otherwise; and
        upon determining a number of stored Sync messages is at least equal to a fault function, indicate an accept event and set a stare timer clock value to zero.

2. The network system of claim 1, wherein during the synchronization process, each node is further configured to:
    set the state timer clock value to zero if the state timer clock value is less than zero; and
    increment the state timer clock value by one if a state timer clock value is less than a state timer synchronization period.

3. The network system of claim 2, wherein during the synchronization process, each node is further configured to:
    set a transmit timer value to zero if the transmit timer value is less than zero;
    set the transmit timer value to zero if the transmit timer value is at least equal to a rate at which the burst of consecutive Sync messages are sent and if the state timer clock value is at least equal to the state timer synchronization period;
    increment the transmit timer value by one if the transmit timer value is less than the rate at which the burst of consecutive Sync messages are sent; and
    execute a new synchronization process if a state timer clock value is at least equal to the state timer synchronization period and if the transmit timer value is at least equal to the rate at which the burst of consecutive Sync messages are sent and if the accept event is not indicated.

4. The network system of claim 1, wherein during the synchronization process, each node is further configured to;
    set the local timer clock value to zero if at least one of: the local timer clock value is less than zero, the local timer clock value is greater than a local timer synchronization period, and the state timer clock value equals a ceiling function of an initial network precision; and
    increment the local timer clock value by one otherwise.

5. The network system of claim 1, wherein the network is an arbitrary, fully connected self-stabilizing, via execution of the synchronization process, from any initial state, and wherein the synchronizer of the first node transmits the Sync message to as many other nodes in the network as are directly connected to the first node.

6. The network system of claim 1, wherein each node is categorized from one of: a good node or a faulty node.

7. The network system of claim 6, wherein a number of arbitrary faulty nodes is no more than a third of a total number of nodes.

8. The network system of claim 6, wherein the fault function is based on considered faulty node types.

9. The network system of claim 1, wherein exchange of messages of each node with other nodes is restricted to defined communication links.

10. The network system of claim 1, wherein at least one of the nodes is anonymous.

11. The network system of claim 1, wherein each of the burst of consecutive Sync messages comprises a 1-bit message.

12. The network system of claim 1, wherein the communication links are bidirectional.

13. A self-stabilizing network comprising a plurality of nodes ("K") in communication with each other, wherein each of the nodes includes:
a synchronizer;
a set of no more than K−1 monitors in communication with the synchronizer and with other nodes, wherein each monitor in the set of monitors is configured to receive transmitted Sync messages from another node, and locally keep track of time of a Sync message in complying with a Sync message lifespan;
a physical oscillator; and
a state timer clock and a local timer clock, wherein each of the clocks are in communication with the synchronizer and driven by the physical oscillator, and each clock locally keeps track of passage of time in a node of the synchronizer as a variable integer clock value;
wherein the synchronizer is configured to execute a synchronization process upon the state timer clock reaching a maximum value, and for each Sync message received, the synchronizer is further configured to:
increment a stored Sync message count when a local timer clock value is at least equal to a minimum event response delay value; and
indicate an accept event when the stored Sync message count is at least equal to a fault function value.

14. The self-stabilizing, network of claim 13, wherein the synchronizer executes the synchronization process without using a central clock or a centrally-generated signal, centrally-generated pulse, or centrally-generated message of any kind for self-stabilization and without relying on an initial state of the network.

15. The self-stabilizing network of claim 13, wherein the fault function value is computed based on a type and number of tolerated faults in the plurality of nodes and equals one plus the number of tolerated faults.

16. The self-stabilizing network of claim 13, wherein a state timer clock value is set to zero upon indicating the accept event.

17. The self-stabilizing network of claim 13, wherein each monitor disposes of all previously stored Sync messages and the stored Sync message count is set to zero upon indicating the accept event.

18. The self-stabilizing network of claim 13, wherein K is at least equal to a sum of two times a number of symmetrically faulty nodes plus a number of delectably faulty nodes plus one.

19. The self-stabilizing network of claim 13, wherein the synchronizer is further configured to:
determine a network precision based on a sum of an initial precision of the network and a maximum drift among good nodes after a state timer synchronization period.

20. The self-stabilizing network of claim 13, wherein the synchronizer is further configured to:
mechanically verify the synchronization process based on convergence, congruence and liveness properties.

* * * * *